United States Patent [19]
Kirst

[11] Patent Number: 6,006,873
[45] Date of Patent: Dec. 28, 1999

[54] INDUSTRIAL SHOCK ABSORBER

[75] Inventor: Rudi Kirst, Langenfeld, Germany

[73] Assignee: ACE StoBdampfer GmbH, Langenfeld, Germany

[21] Appl. No.: 08/861,468

[22] Filed: May 21, 1997

[30] Foreign Application Priority Data

Aug. 23, 1996 [DE] Germany .............................. 196 34 092

[51] Int. Cl.$^6$ ....................................................... F16F 9/48
[52] U.S. Cl. ............... 188/287; 188/322.19; 188/322.15; 188/322.22; 188/298; 188/314; 267/122
[58] Field of Search ..................................... 188/287, 286, 188/322.15, 322.22, 298, 322.17, 282.7, 282.8, 282.5, 282.6, 317, 316, 315, 284, 322.19; 91/408; 267/124–129, 64.11, 122, 118, 117, 64.19, 64.21, 64.27, 119, 130, 221, 36

[56] References Cited

U.S. PATENT DOCUMENTS

| | | | |
|---|---|---|---|
| 2,944,639 | 7/1960 | Blake ........................................ | 188/287 |
| 2,985,319 | 5/1961 | Simmons ................................... | 188/287 |
| 3,007,551 | 11/1961 | Rumsey .................................... | 188/287 |
| 3,176,972 | 4/1965 | Deschner ................................. | 188/287 |
| 3,439,913 | 4/1969 | Kamman .................................. | 267/64.24 |
| 3,491,993 | 1/1970 | Scholin et al. ............................ | 188/287 |
| 3,495,719 | 2/1970 | Peppers .................................... | 188/287 |
| 3,679,069 | 7/1972 | Shaver et al. ............................ | 188/298 |
| 3,726,419 | 4/1973 | Anderson et al. ........................ | 188/298 |
| 3,998,302 | 12/1976 | Schupner .................................. | 188/287 |
| 4,230,309 | 10/1980 | Schnitzius ................................ | 267/124 |

FOREIGN PATENT DOCUMENTS

| | | |
|---|---|---|
| 0 386 433 | 1/1990 | European Pat. Off. . |
| 0 436 461 B1 | 1/1990 | European Pat. Off. . |
| 3302790 C2 | 6/1989 | Germany . |
| 3324165 C2 | 7/1989 | Germany . |
| 93 02 454 U | 5/1993 | Germany . |
| 1397640 | 5/1988 | U.S.S.R. ................................. 188/287 |
| WO 86/00675 | 1/1986 | WIPO . |
| WO 94/17317 | 8/1994 | WIPO . |

OTHER PUBLICATIONS

Ace Industrie–Stossdämpfer, 3 pages, MC150 bis 600 and SC190 bis 650.
Ace Industrie–Stossdämpfer booklet, 75 pages.
Stossdämpfer Sommer Automatic booklet, 12 pages.

*Primary Examiner*—Douglas C. Butler
*Attorney, Agent, or Firm*—Brinks Hofer Gilson & Lione

[57] ABSTRACT

The invention relates to an industrial shock absorber requiring very few component parts, which can be cost-effectively produced while expensive milling operations are avoided, wherein different damping curves can be realized relatively simply. The shock absorber has good temperature stability in the cold and warm states, wherein the largest possible piston diameter can be achieved because of the special construction in accordance with the invention, which further contributes to stability and safety.

13 Claims, 2 Drawing Sheets

INDUSTRIAL SHOCK ABSORBER

FIELD OF THE INVENTION

The invention relates to an industrial shock absorber with a tube-shaped body and a damper piston which is longitudinally displaceable and sealingly arranged therein.

BACKGROUND OF THE INVENTION

German Patent Publication DE 33 24 165 C2 relates to a hydraulic shock absorber with two operative ends, having a pressure tube, arranged in a housing and filled with hydraulic fluid, and several fixedly set or adjustable throttle openings, which are distributed over the length of the pressure tube and are connected on one side to a pressure chamber of the pressure tube and on the other side to hollow chambers of the housing, and having piston rod seals on the ends, wherein respectively one piston is associated with the common pressure chamber of the pressure tube. The cup-shaped piston is connected in one piece with the pressure tube. The second piston moves over the throttle bores, which results in a damping effect.

The disadvantage of this construction lies in the active piston surface, which is relatively small in relation to the exterior diameter. For this reason the throttle bores must be made very narrow, which causes problems in connection with their manufacture. In addition, dirt in the damping fluid can lead to closure of the throttle bores.

International application WO 94/17317 (PCT/DE93/01260) and German Utility Model G 93 02 454.1 also relate to a hydraulic shock absorber, wherein an axially helically extending damping groove is arranged on the piston jacket of the damping piston, wherein a coaxial, endlessly extending oil outflow groove is arranged on the interior jacket face of the oil and piston chamber, which groove is completely covered by the piston in the initial position of the piston. This shock absorber has a gas pressure reservoir and rubber cuffs as the equalizer for the amount of oil. Hydraulic shock absorbers of this type are provided with a cylinder housing with a piston and with an oil outflow regulator, which regulates the oil flow from the oil and piston chamber and causes a reduction of kinetic energy acting on the piston, and with an oil outflow valve and a spring force, which pushes the piston back into its initial position. The damping groove, which extends axially on the circumferential jacket of the piston, terminates at the front face of the piston, wherein a coaxial, endlessly extending oil outflow groove is provided on the interior jacket face of the oil and piston chamber, which in the initial position of the piston is completely covered by the piston. Two damping grooves, offset by 180ø in respect to each other, extending axially and having oil flow cross sections which are different from each other, are disposed on the circumferential jacket of the piston. The exterior circumferential rim of both the front face of the piston and the piston bottom is interrupted by the damping groove terminating in the front face of the piston and the piston bottom. This known shock absorber is furthermore said to be distinguished in that one of the damping grooves is provided with a cross section which in particular narrows continuously from the front face of the piston to the piston bottom, while the other damping groove is provided with a cross section which remains the same over its entire length and is of the same depth. The cross section of the continuously narrowing damping groove is embodied as a section of a circle. An adjustable regulating valve, which is in direct engagement with the damping groove, is provided in one damping groove for regulating the oil flow. It is furthermore proposed to provide a slider, which can be adjusted perpendicularly in respect to the damping groove, with a one-sidedly coaxial slider tip, whose axial longitudinal section corresponds to the cross section of the damping groove, wherein the slider tip can be interlockingly screwed into the damping groove. The slider should be disposed, radially and axially adjustable, directly in the cylinder housing. The slider is sealed against the housing, in particular by an O-ring. The oil outflow groove is provided with a rectangular cross section. At least one oil outflow groove is provided on the interior jacket face of the oil and piston chamber directly adjacent to the piston, which terminates on the one side in the oil outflow groove and on the other side extends past the piston when it is in its initial position. Two oil outflow grooves, which are located opposite each other and extend axially, are disposed on the interior jacket face of the oil and piston chamber. These oil outflow grooves are provided with a round cross section of little radial depth. An oil reservoir formed by a body-elastic rubber cuff is provided spatially axially behind the oil and piston chamber. The rubber cuff is a coaxial symmetrical shaped body which is respectively provided with coaxial circular flanges in the area of its two front faces. With the two flanges the rubber cuff is in engagement with a groove in a bearing sleeve. A coaxially extending gas chamber is formed between the rubber cuff and the bearing sleeve. The housing on the side of the piston rod is provided with two coaxial seals located one behind the other. The seals are formed of a sealing medium support with an O-ring, which seals coaxially toward the adjoining interior housing jacket and with a seal ring, which seals coaxially toward the piston rod. A venting groove is formed between the two sealing medium supports, wherein a venting bore is provided in the wall of the housing adjacent to the venting groove. For forming an oil gap, the piston is seated, axially displaceable to some extent, on the piston rod, in particular on a pin connected in one piece with the piston rod. A sealing disk is disposed coaxially and seated between the piston bottom of the piston and the one front face of the bearing sleeve. The outer jacket face of the sealing disk is smaller by an oil gap than the diameter of the adjoining interior jacket face of the oil and piston chamber. A spring force, seated and acting in the oil and piston chamber, is provided for returning the piston into its initial position. The housing is provided with a screw thread extending in particular over the entire outer cylindrical length. A one-sided, coaxially extending cylindrical bolt for placing a seal ring is disposed on the exterior circumference of the housing in the area of the outlet of the piston rod. Two surfaces, located opposite each other, for applying a mounting tool are disposed on the exterior circumference of the housing, in particular in the area of the housing end located opposite the exit of the piston rod.

Hydraulic shock absorbers of the previously described type are constructed extraordinarily elaborate and consist of many single parts, so that the production costs are correspondingly high. The ability to reproduce the damping behavior is reduced in particular when employing a helical groove. The rubber cuff is difficult to mount, since initially its ends have to be sufficiently stretched so that it can be passed over elements of considerably larger cross section. Afterward it must be glued in properly, which is also connected with difficulties because of the special construction. Thus the production as a whole is hard to control. Since the calculation and production of the helical groove in the production piston is connected with a relatively high outlay, the exact capability of reproducing damping curves can only be partially realized. In case of warming of the oil after several hours of operation the flow-through behavior of the hydraulic fluid in the helical groove changes and with it the characteristic curve of the entire shock absorber.

European published, non-examined patent application EP 0 386 433 (90101539.6) relates to a hydraulic shock absorber with a housing embodied particularly as a cylinder, in which a high pressure chamber filled with a hydraulic medium is disposed, which can be charged by a piston which is displaceable in a housing by means of a mass movement to be damped and displaces hydraulic medium out of the high pressure chamber in the course of its damping movement, wherein a damping device is provided, which operates pressure-dependently under the influence of the pressure prevailing in the high pressure chamber in order to regulate the displacement flow. In addition to the first damping device, which operates in a pressure-dependent manner, a second damping device, which operates in a path-dependent manner under the influence of the displacement path of the piston, is provided for regulating the displacement flow. The shock absorber has a spring-loaded intermediate piston with a double seal as the oil equalizing reservoir and a throttle needle, which plunges into a conical bore. An overpressure valve is additionally represented on the damping piston.

The double seal is disadvantageous, since it must seal on the inside as well as the outside. Furthermore, the fact of a plurality of individual parts should be stressed as being disadvantageous.

German patent publication DE 33 02 790 C2 relates to a shock absorber with a hydraulic cylinder, in whose interior an adjustment piston is disposed, which is displaceable in the axial direction and separates a high pressure chamber filled with a hydraulic fluid from a low pressure chamber, and is in connection with a piston rod which extends in the axial direction, crosses one of the chambers while reducing its fill cross section and sealingly penetrates the associated cylinder front face toward the exterior. The two pressure chambers of different fill cross section are connected on the one hand by means of an interposed spring-loaded overflow valve, which is fixed on the housing in the interior of the cylinder and whose closing force can be regulated and which opens when the high pressure chamber is compressed, and on the other hand by means of a flap valve formed in the adjustment piston and arranged parallel with the overflow valve. The low pressure chamber communicates with an equalization chamber for the hydraulic fluid. A second low pressure chamber, located on the axial side of the high pressure chamber opposite the first low pressure chamber and communicating with the first low pressure chamber via a flow conduit extending mainly in the axial direction, is interposed in the connection between the overflow valve and the first low pressure chamber which is crossed by the piston rod. The overflow valve is located in the space between the high pressure chamber and the second low pressure chamber and essentially follows the high pressure chamber directly, wherein the equalization chamber is formed by one of the low pressure chambers and is always completely filled and acted upon by a spring-loaded work piston.

The structural length, the multitude of individual parts and in particular the multitude of sealing elements and, because of this, an expensive production, are disadvantageous in this design.

International application WO 86/00675 (PCT/GB85/00298) also relates to a shock absorber, wherein a pressure control valve is provided in place of throttle bores. However, pressure control valves in shock absorbers have been shown to be trouble-prone and as a rule react too slowly. It is not possible to control different damping curves with them.

European patent publication EP 0 436 461 B1 relates to a hydraulic shock absorber for the industry, which has a piston rod on which a throttle orifice is disposed and cooperates with a throttle needle with a stepped cross section which increases from the free tip to the cylindrical, attachable part. Over its entire length with which it cooperates with the throttle orifice, the throttle needle is designed conically, wherein the conicity decreases, starting at the tip. This model operates with a diaphragm pressure reservoir as the oil equalizer and with a conically stepped throttle needle. This embodiment also has a great structural length in relation to the stroke. It is difficult to maintain the throttle needle exactly in the center. When the oil warms, the damping behavior fluctuates more strongly than with covered throttle bores.

OBJECT AND SUMMARY OF THE INVENTION

The invention is based on the object of providing an industrial shock absorber operating by means of a liquid damping medium, which permits a simple capability of reproducing different damping curves over a large temperature range while the damping piston has a relatively large diameter in respect to the exterior diameter and is structurally simply designed.

An industrial shock absorber in accordance with the invention can be manufactured from relatively few component parts—simply and cost-effectively. For example, the housing can be mass-produced and can have two bores for a stud driver on the bottom, for example. The piston rod can also be mass-produced and have a groove and a shoulder which is turned on a lathe. Furthermore, the cup-shaped piston is mass-produced and provided with throttle bores and a flap valve bore. The bearing can also be mass-produced and can be glued in, for example, during assembly. Also, a rolled diaphragm or a ring holding a pressure reservoir made of a closed-cell elastomer can be mass-produced and merely needs to be provided with one or several bores. If a rolled diaphragm is provided, it is used as a seal, as a volume equalizer for the piston rod and a restoring spring.

With embodiments having a pressure reservoir or an absorber consisting of a closed-pore elastomer, the latter is used as volume equalizer when the piston rod is retracted.

The invention is represented in the drawings, partially schematically, by means of two exemplary embodiments in longitudinal section.

DETAILED DESCRIPTION OF THE PREFERRED EMBODIMENTS

Figure 1:
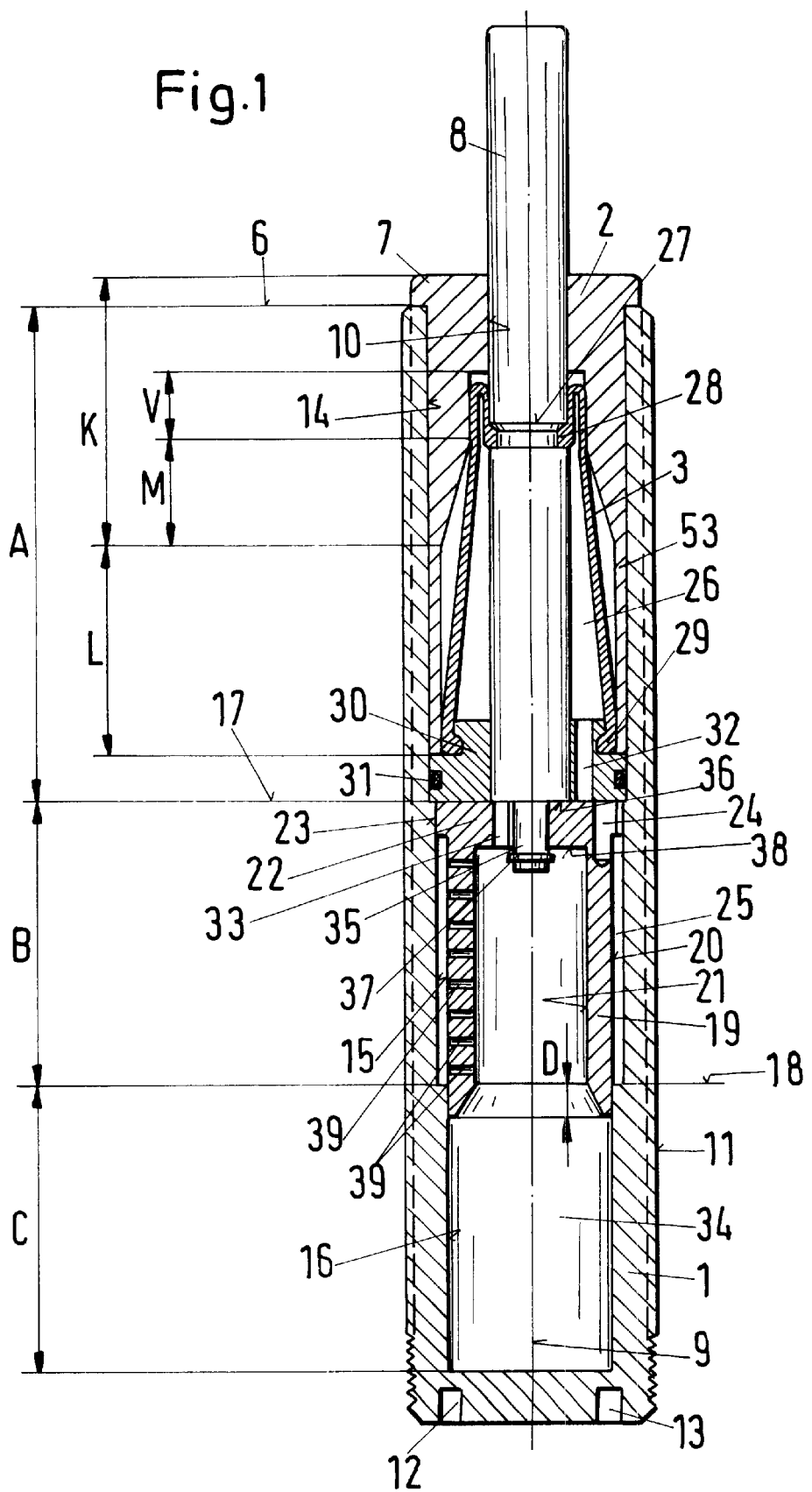
FIG. 1 represents an industrial shock absorber with a roller diaphragm.

A tube-shaped housing, made of one-piece from steel, is identified by the reference numeral 1 and is produced, for example, by drilling a rod open and is therefore particularly tight and pressure-resistant. The housing 1 is embodied to be open on one side only. A bearing bush 2 is disposed in the open mouth, for example glued in, screwed in or fastened in some other way tightly, but releasably, in the housing 1. The bearing bush 2 is sealed toward the exterior. This is accomplished in the embodiment in accordance with FIG. 1 by a means of a rolled diaphragm 3, and in the embodiment in accordance with FIG. 2 by means of a seal 4 disposed in a grooved recess of the bearing bush 2. If required, the seal 4 can also be multiply disposed, in particular it can act sealingly toward both sides. In the embodiment in accordance with FIG. 2, a seal 5 is furthermore disposed in an annular groove.

It can be seen that the bearing bush 2 extends past the outside-facing annular front face 6 by means of a collar 7 of increased diameter. This collar 7 has an annular face extending plan-parallel with the annular front face 6, so that with its collar 7 the bearing bush 2 rests flat on the annular front face 6.

A piston rod 8 is disposed longitudinally displaceable in the bearing bush 2 in a bore 10 extending coaxially with the longitudinal center axis 9.

In the represented embodiments, the exterior jacket face 11 of the housing 1 is embodied with the same diameter and can be shaped cylindrically. It can furthermore be seen in FIGS. 1 and 2 that on the end section facing away from the piston rod 8 the represented embodiments are provided with an exterior thread for fastening the industrial shock absorbers on a device, not shown, for example on a manipulating device, in a machine tool or the like.

On the front end which is embodied closed, both embodiments have two blind bores 12 or 13, which are disposed mirror-reversed in respect to the longitudinal center axis 9 and into which a tool, not shown, can be inserted.

In its interior the housing 1 consists of a total of three successive housing segments 14, 15 and 16 delimited by cylindrical jacket faces. With the represented embodiments the arrangement has been made such that the respectively succeeding housing segment is of a reduced diameter. This means that the housing segment 14 has the largest interior diameter, the succeeding housing segment 15 a somewhat smaller diameter and the housing segment 16 has the smallest diameter. The housing segments 14, 15 and 16 are embodied to be continuously cylindrical over their respective lengths A, B or C. Furthermore, all housing segments 14, 15 and 16 are arranged coaxially with each other, so that the housing 1 has a cartridge-shaped exterior.

Because of the division of the housing 1 into the three housing segments 14, 15 and 16 with respectively different interior diameters, an inward-projecting, relatively sharp-edged annular shoulder 17 or 18 results respectively at the transition to the succeeding housing segment, i.e. from 14 to 15 and from the housing segment 15 to 16.

As can be seen from the drawings, the longitudinal section facing the closed front end of the housing 1 of a cup-shaped damping piston 19 is led as pressure medium-tight as possible, except for minor leaks, along the interior wall of the housing section 16. To this end the exterior jacket face 20 of the damping piston 19 is matched to the interior jacket face of the housing section 16. If the interior jacket face of the housing segment 16 is cylindrical, except for minor leaks, the exterior jacket face 20 is also embodied cylindrical.

In all embodiments the damping piston 19 is embodied tube-shaped and open at its front end facing the closed end section of the housing 1, and the damping piston 19 is conically widened toward the outside on a longitudinal segment D.

The damping piston 19 is provided on its interior with a cylindrical interior jacket face 21 which extends over approximately 80% of the total length of the piston. The material of the tube-shaped portion of the damping piston 19 is connected by means of a piston bottom 22 in one piece with the tube-shaped longitudinal section of the damping piston 19. In this area the damping piston 19 has an annular shoulder 23 overlapping the exterior jacket face 20, by means of which the damping piston 19 is seated and guided longitudinally displaceable on the interior jacket face of the housing segment 15. The annular shoulder 23 can be provided with several bar-shaped openings or, as represented, with at least one, preferably several connecting bores 24 distributed over the circumference and extending parallel with the longitudinal center axis 9.

An annular space 25, which is connected via the openings or connecting bores 24 or the like with an equalization chamber in a fluid-conducting manner, is disposed between the exterior jacket face 20 of the damping piston 19 and the interior jacket face of the housing segment 15.

In the embodiment in accordance with FIG. 1, the rolled diaphragm 3 is disposed in this equalization chamber 26 and is connected, sealed against pressure medium, with its one end over a bead 28 with an annular groove 27 of the piston rod 8. At its other end the rolled diaphragm 3 is connected, also over a bead 29, with an annular groove of a ring 30, through the center of which the piston rod 8 penetrates. The ring 30 is sealed against fluid by means of a seal 31 on the interior wall of the housing segment 14. The beads 28, 29 are also embodied to be sealed against fluid.

At least one conduit 32, whose longitudinal axis extends parallel with the longitudinal center axis 9, is provided in the ring 30. The conduit 32 connects the equalization chamber 26 via the connecting bore 24 or the like with the annular chamber 25 in a manner yet to be described.

A further through-bore 33 is additionally provided in the piston bottom 22, which connects a damping chamber 34 in a manner yet to be described via the conduit 32 also with the equalization chamber 26.

A pin 35 with a reduced diameter is connected as one piece with the piston rod 8 which has an annular shoulder 36 on its free end, wherein a detent, for example a snap ring 37, is releasably disposed on the pin 35. As can be seen from FIG. 1, in the initial position shown some play is provided between the interior 38 of the piston bottom 22 and the detent 37. The pin 35 need not be disposed sealed against fluid in the bore of the piston bottom 22 receiving it. However, the pin 35 is disposed longitudinally displaceable in the through-bore of the piston bottom 22 by an amount which is axially limited by the annual shoulder 36 of the piston rod 8 on the one side and the detent 37 on the other.

It can furthermore be seen in FIG. 1 that on its one side the damping piston 19 has several throttle bores 39, which are disposed parallel with each other and connect the damping chamber 34 with the annular chamber 25. During an axial displacement, i.e. during a damping process, these throttle bores 39 are covered one after the other by the relatively sharp-edged annular shoulder 18 and sealed, so that in the course of the damping piston 19 plunging into the damping chamber 34 less and less throttle bores 39 are available for the flow-off of the throttle fluid into the annular chamber 25 and therefore via the connecting bore 24 and the conduit 32 into the equalization chamber 26.

In the course of the damping piston 19 plunging in, i.e. during the damping process, the plan-parallel front of the damping piston 19 which extends orthogonally with the longitudinal center axis 9 and faces the ring 30 is lifted off the plan-parallel II front face of the ring 30, which is embodied in the same way, so that damping fluid can exit through the throttle bore 39 into the annular chamber 35, the connecting bore 24 and the conduit 32 into the equalization chamber 26, wherein the rolled diaphragm 3 is placed under spring-elastic tension so that later on during the return of the shock absorber into its initial position it assists by acting in the manner of a spring element.

In this case the through-bore 33 is covered by the annular shoulder 36 of the piston rod 8. This annular shoulder extends orthogonally with the longitudinal axis 9, the same as the front face of the piston bottom 22 facing the piston rod 8. Both the front faces of the annular shoulder 36 of the piston rod 8 and of the piston bottom 22 are embodied plan-parallel and rest sealingly on each other until the damping piston 19 is lifted off the annular shoulder 36 of the piston rod 8.

In the embodiment shown in FIG. 1, the bearing bush 2 has a relatively long cylindrical section on its outer jacket face, which fittingly engages the housing segment 14 and rests against it interior wall.

To form the equalization chamber 26, the bearing bush 2 has a longitudinal section L, whose wall is delimited inside and outside by cylindrical walls and has a relatively thin wall thickness. Thus the bearing bush 2 is embodied to be tube-shaped over the longitudinal section L. A longitudinal section K adjoins the longitudinal section L and is composed of the collar 7 and a longitudinal section with an increased wall thickness. This last longitudinal section has a conically tapering longitudinal section M and a cylindrical longitudinal section V. The bead 28 and a portion of the rolled diaphragm 3 are disposed in the latter, while the rolled diaphragm 3 is spring-elastically deformed into the longitudinal section M and in the longitudinal section L during the damping process. The transition between the longitudinal section L and the longitudinal section M can take place via a radius in order to protect the rolled diaphragm 3.

If an impulse is directed on the piston rod 8 and/or the housing 1, these elements are pushed together in a telescoping manner, wherein the damping piston 19 plunges into the damping chamber 34, and its throttle bores 39 are sealed one after the other by the interior wall of the housing section 16 as fluid-tightly as possible.

Following the braking of the mass, the rolled diaphragm 3, which is under tension and which can be made of an elastomer, causes the return of the telescoped parts. In this case the annular shoulder 36 of the piston rod 8 is lifted off the front face of the piston bottom 22, so that the through-bore 33 is also opened. The displacement of the piston rod 8 in respect to the damping piston 19 lasts until the detent 37 touches the interior front face 38 of the damping piston 19. Therefore the annular shoulder 36 of the piston rod 8 and the through-bore 33 constitute a flap valve. In this way it is possible for the fluid stored in the equalization chamber 26 to flow through the conduit 32 and through the through-bore 33 back into the damping chamber 34. A part of the damping fluid also enters the damping chamber 34 through the connection bore 24 or the like and the throttle bores 39 until the industrial shock absorber has reached its initial position visible in FIG. 1.

Not only the housing 1, the bearing bush 2, the piston rod 8, the ring 30 and the damping piston 19 can be made of metallic materials, for example steel, but also the detent 37.

The seals and the rolled diaphragm 3 are respectively made of aging-resistant, ozone-resistant, non-fading elastomers which are resistant to the damping fluids used, for example of polyurethane caoutchouc with spring-elastic properties.

Figure 2:
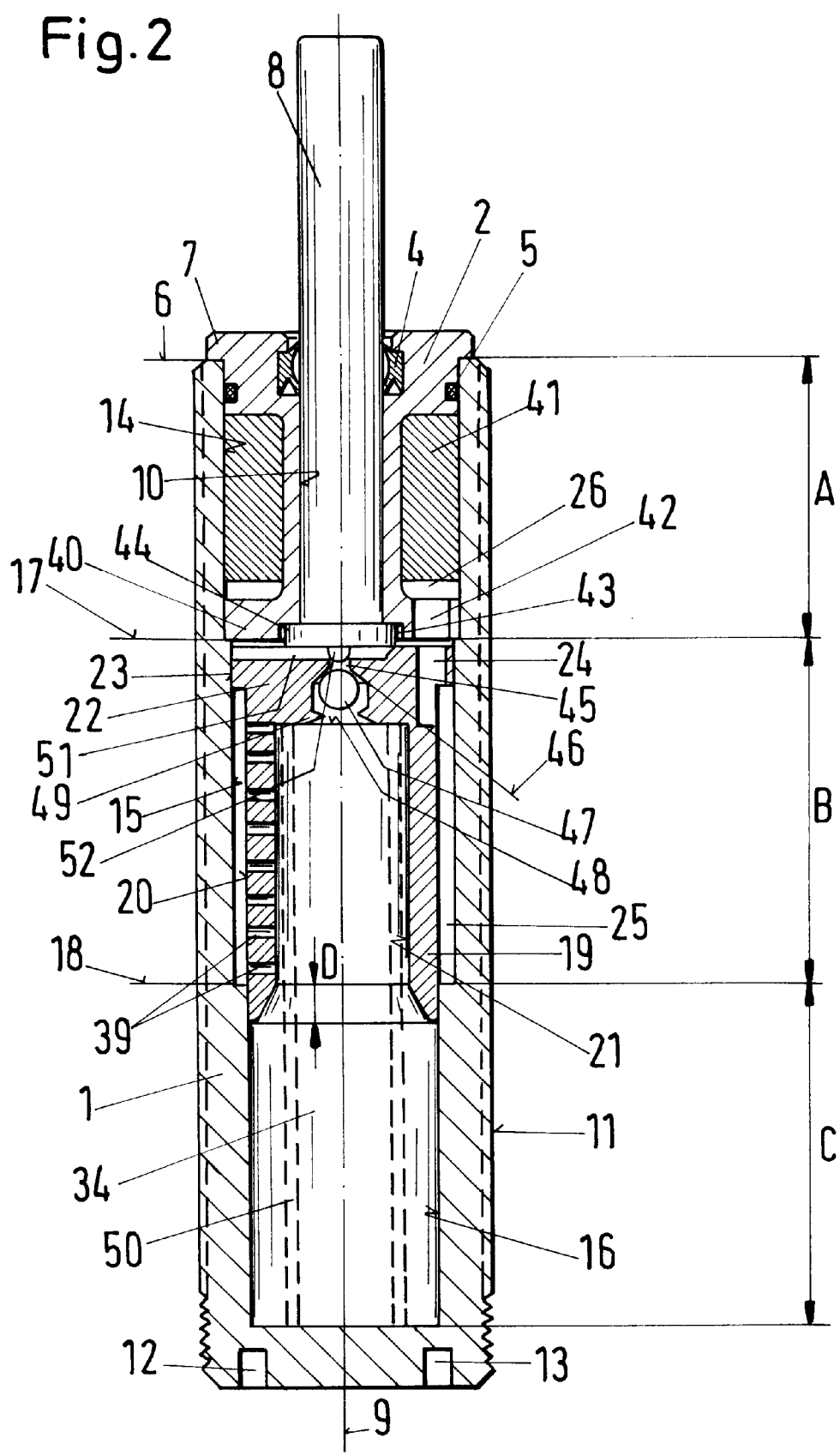
FIG. 2 represents a similarly constructed industrial shock absorber with an elastomer pressure reservoir.

In the embodiment according to FIG. 2, the bearing bush 2 is embodied in the approximate shape of a double T, as can be seen from the axial longitudinal section visible in the drawings, wherein the one bar of the double T is made in one piece of the same material with the collar 7, while the other bar of the double T is disposed at an axial distance from the collar 7 and is embodied as an annular bearing flange 40. This annular bearing flange 40 is seated on the annular shoulder 17. Otherwise the exterior jacket surface of the annular bearing flange is also cylindrically designed and fits snugly into the longitudinal segment 14 and rests flat against the interior jacket face of the housing segment 14.

The equalization chamber 26 is created between the annular shoulder 17 and the annular bearing flange 40 in which, the equalization or receiver element 41, made of an elastic elastomer plastic material, is disposed. The receiver or equalization element 41 is embodied as a closed-pore sponge and is used to equalize the volume of the retracted piston rod.

A conduit which has the same function as the conduit 32 in the embodiment of FIG. 1 is identified by 42. The piston rod 8 is arranged in a depression 43 on the end front face. To this end the piston rod 8 has a shoulder 44 of increased diameter which partially projects out of the depression 43 in the axial direction toward the damping piston 10. The depression 43 is disposed coaxially in respect to the longitudinal center axis 9.

A through-bore 45 is provided in the piston bottom 22, which has the same purpose as the through-bore 33. Furthermore, a valve seat 46 is provided in the piston bottom 22, to which a blocking body 47 is assigned, which in this case is embodied as a ball. So that this ball 47 cannot fall out of the valve chamber 48 formed in the piston bottom 22, the rim areas 49 facing the damping chamber 34 are flanged by chiseling or the like, but without closing the flow cross section.

A compression spring, only schematically indicated, is identified by 50, which is supported under pre-stress at its one end on the closed bottom of the housing 1 and with the other end on the piston bottom 22. The compression spring 50 is seated and guided by the cylindrical portion of the damping piston 19. The compression spring 50 is used to push the damping piston 19 and the piston rod 8 into the indicated initial position.

The mode of functioning of the embodiment represented, an equalization or receiver element 41, made of an elastic elastomer plastic material, is disposed. The receiver or equalization element 41 is embodied as a closed-pore sponge and is used to equalize the volume of the retracted piston rod.

A conduit which has the same function as the conduit 32 in the embodiment of FIG. 1 is identified by 42. The piston rod 8 is arranged in a depression 43 on the end front face. To this end the piston rod 8 has a shoulder 44 of increased diameter which partially projects out of the depression 43 in the axial direction away from the damping piston 10. The depression 43 is disposed coaxially in respect to the longitudinal center axis 9.

A through-bore 45 is provided in the piston bottom 22, which has the same purpose as the through-bore 33. Furthermore, a valve seat 46 is provided in the piston bottom 22, to which a blocking body 47 is assigned, which in this case is embodied as a ball. So that this ball 47 cannot fall out of the valve chamber 48 formed in the piston bottom 22, the rim areas 49 facing the damping chamber 34 are flanged by chiseling or the like, but without closing the flow cross section.

A compression spring, only schematically indicated, is identified by 50, which is supported under pre-stress at its one end on the closed bottom of the housing 1 and with the other end on the piston bottom 22. The compression spring 50 is seated and guided by the cylindrical portion of the damping piston 19. The compression spring 50 is used to push the damping piston 19 and the piston rod 8 into the indicated initial position.

The mode of functioning of the throttle bores 39 is the same as described in connection with FIG. 1.

At least two bores or conduits 51 and 52, which intersect at right angles and are approximately semicircular, are disposed on the end section facing the piston rod 8, so that damping fluid can flow out of the equalization chamber 26 via the flap valve, i.e. past the blocking body 47, into the damping chamber 34 when the telescoping elements are retracted.

In this embodiment, too, the housing 1, the seating bush 2, the piston rod 8, the damping piston 19 and the blocking body 47 are made of a metallic material, in particular steel.

It can be seen by means of a comparison between WO 94/17317 and the embodiments represented in FIGS. 1 and 2 how few component parts are needed for an industrial shock absorber in accordance with the invention and how simple the structure of these embodiments in accordance with the invention is:

| For comparison | WO 94/17317 | Invention |
| --- | --- | --- |
| Total component parts | 14 | 8 or 9 |
| Standard or purchased parts | 4 | 2 or 3 |
| Parts to be manufactured | 10 | 6 |

The features described in the specification, the claims and the abstract and which can be taken from from the drawings can be important for realizing the invention individually as well as in any arbitrary combination.

What is claimed is:

1. An industrial shock absorber comprising:
    a tube-shaped housing having a continuously cylindrical outside shape and a bearing bush (2) at one end thereof (1);
    a cup-shaped damping piston (19) sealingly disposed and longitudinally displaceable in said tube-shaped housing (1) and to which is coupled a piston rod (8), sealingly guided through said bearing bush (2) to an exterior of said tube-shaped housing;
    wherein the inside of said housing comprises three housing segments (14, 15, 16), which are separated from each other by annular shoulders (17, 18), such that the diameters of the housing segments (14, 15, 16) decrease, starting at housing segment (14) that surrounds said piston rod (8) and ending at housing segment (16), in which said damping piston (19) is guided;
    wherein the damping piston (19) has a plurality of throttle bores (39) extending through a wall thereof and which provides for fluid communication between a damping chamber (34) located in said tube-shaped housing in front of said damping piston and an annular chamber (25) located in said tube-shaped housing surrounding the damping piston;
    wherein said annular chamber is connected for conducting fluid to an equalization chamber (26) located on a back of the damping piston (19),
    wherein said damping piston (19) includes a bottom (22), a connection bore (24) formed is said bottom, which connects said annular chamber (25) in a fluid-conducting manner and directly with the equalization chamber (26),
    wherein the at least one throttle bore (39) is closed off by an annular shoulder (18) located on an interior wall of the housing (1) by means of an axial displacement of the damping piston (19),
    a valve (33, 36, 37 or 45, 47, 48) coupled to a bottom (22) of said piston (19) providing a fluid-conducting connection between the damping chamber (34) and the equalization chamber (26) during a return stroke of the damping piston (19); and
    wherein the annular shoulder (18) can pass over more than one of said plurality of throttle bores (39) disposed one behind another parallel to a longitudinal axis of the damping piston (19) to cover and block said more than one of said plurality of throttle bores (39).

2. The shock absorber in accordance with claim 1, characterized in that the damping piston (19) is guided and longitudinally displaceable, by means of an annular shoulder (23), which is associated with said bottom (22) of said piston (19), in housing segment (15), whose diameter is relatively larger than housing segment (16) at the end, into which the damping piston (19) plunges during a damping stroke.

3. The shock absorber in accordance with claim 1 characterized in that the piston rod (19) has a one-piece pin (35) of a reduced diameter, whose length is greater than the thickness of the piston bottom (22) measured in an axial direction, and that the pin (35) penetrates through a centered bore of the bottom (22) of the piston wherein at a distance from its free end the pin (35) has a detent, which is disposed with axial play in respect to the piston bottom (22) facing this side, so that the piston bottom (22) is displaceable by a defined amount on the pin (35), wherein the piston bottom (22) and the piston rod (8) are delimited in a transition area to the pin (35) by means of flat surfaces extending orthogonally in respect to a longitudinal center axis (9) of the shock absorber, with which they rest flat on each other and close a through-bore (33) during a damping stroke.

4. The shock absorber in accordance with claim 1 characterized in that a valve chamber (48) is disposed in the piston bottom (22), to which a blocking body (47) is associated, and that the valve chamber (48) is connected via a through-bore (45) in a fluid-conducting manner to at least one conduit (51, 52).

5. The shock absorber in accordance with claim 4 characterized in that a closed-pore sponge is provided in said equalization chamber (26) for the purpose of equalizing the volume of the retracted piston rod (8).

6. The shock absorber in accordance with claim 1 characterized in that the throttle bores (39) are disposed evenly distributed over the circumference of the damping piston (19).

7. The shock absorber in accordance with claim 1 characterized in that the longitudinal axes of the throttle bores (39) extend parallel with each other.

8. The shock absorber in accordance with claim 1 characterized in that an effective piston surface of the damping piston (19) is only slightly smaller in size than a housing cross section of the housing (1).

9. The shock absorber in accordance with claim 1 further comprising a rolled diaphragm (3) connected on one side in a fluid-tight manner by means of a bead (28) with the piston rod (8) in the equalization chamber (26), and on another side by means of a bead (29) with a ring (30), wherein the ring

(30) is radially fixed in place in a sealing manner in the housing segment (14) with a greatest diameter on the annular shoulder (17) by the interior wall of the housing segment (14) with the largest diameter, and radially by the annular shoulder (17) of this housing segment (14) and axially by a tube-shaped section (53) of the bearing bush (2), wherein the ring (30) has a conduit (32), which is connected to said connecting bore (24), and the rolled diaphragm (3) is used as a seal for volume compensation and as a restoring spring for the damping piston (19).

10. The shock absorber in accordance with claim 9, characterized in that, when inserted into the pressure chamber of a compressed air cylinder and acted upon by pressure, the rolled diaphragm (3) provides an additional force component for returning the piston rod (8) and the damping piston (19).

11. The shock absorber in accordance with claim 1 characterized in that the housing (1), the piston rod (8), the equalization chamber (26), the flap valve (33, 36, 37 or 45, 47, 48), and the damping piston (19), are supported with pre-stress at one end on the housing (1) and at the other end in the cup-shaped damping piston (19), and are arranged coaxially in respect to each other.

12. The shock absorber in accordance with claim 1 characterized in that the housing (1) and the damping piston (19) are produced by drilling open solid rod material of steel.

13. The shock absorber in accordance with claim 1 characterized in that a closed-pore sponge is provided in said equalization chamber (26) for the purpose of equalizing the volume of the retracted piston rod (8).

* * * * *